F. E. HEYLMANN.
VEHICLE TOP DOOR.
APPLICATION FILED NOV. 27, 1908.
936,892.
Patented Oct. 12, 1909.
3 SHEETS—SHEET 1.
Fig-1-
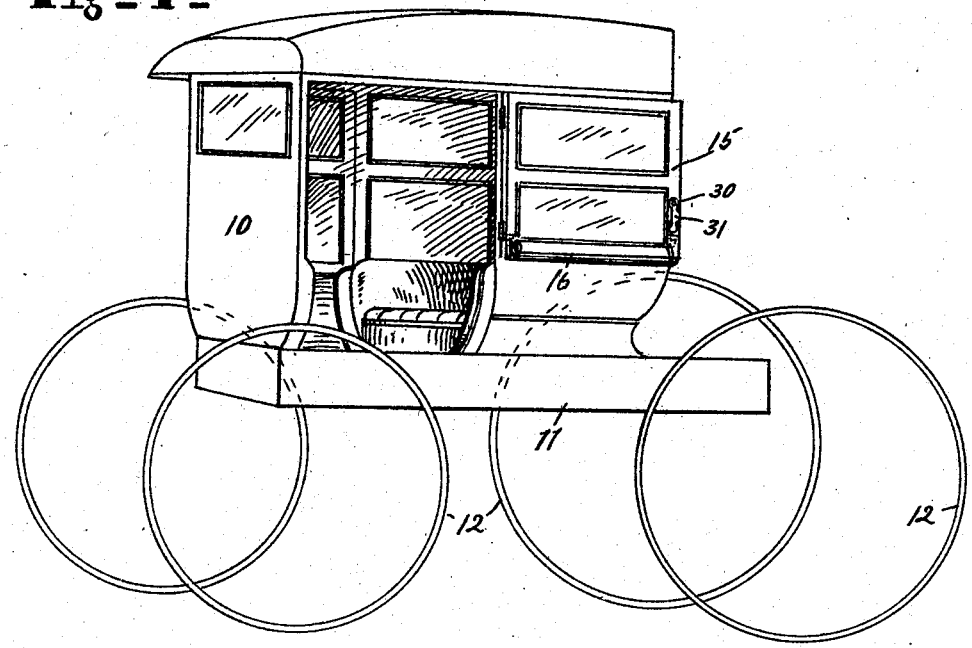
Fig-2-
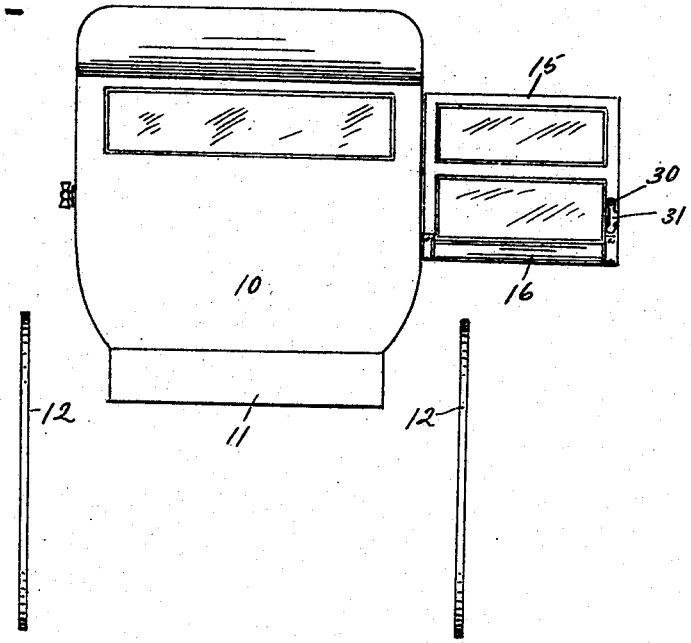
WITNESSES:
O. M. McLaughlin
O. M. Greener
INVENTOR.
Frederick E. Heylmann.
BY
ATTORNEY.

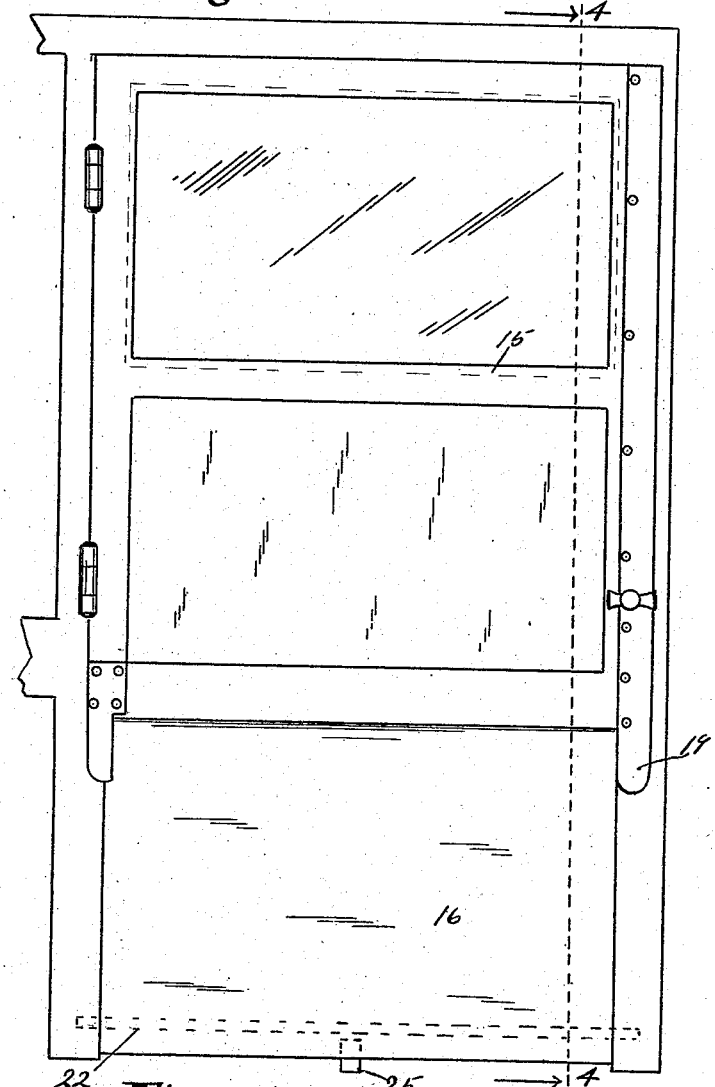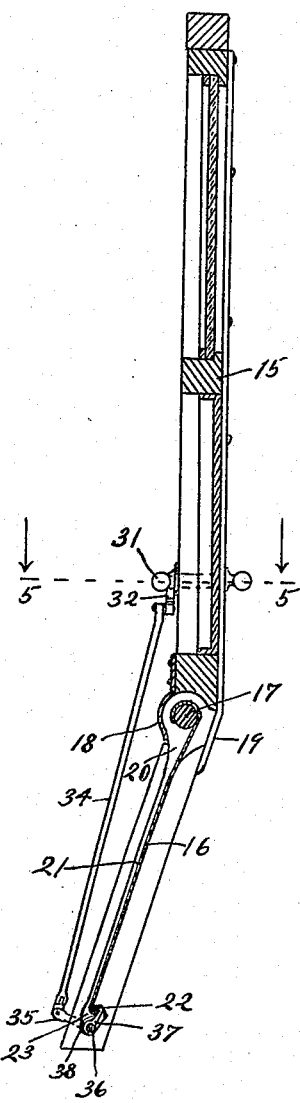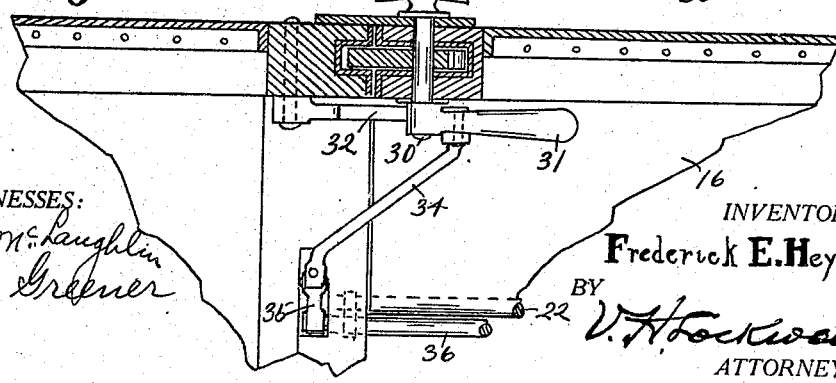

F. E. HEYLMANN.
VEHICLE TOP DOOR.
APPLICATION FILED NOV. 27, 1908.
936,892.
Patented Oct. 12, 1909.
3 SHEETS—SHEET 3.
Fig-6-
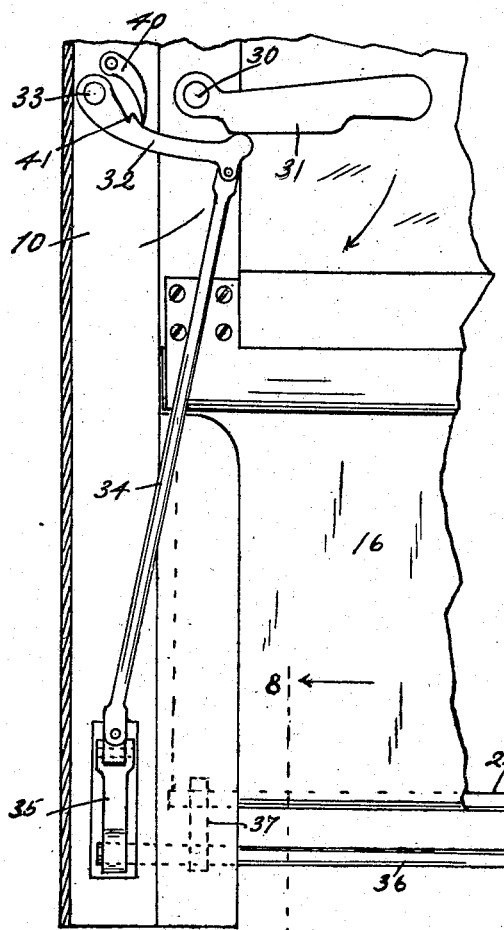
Fig-7-
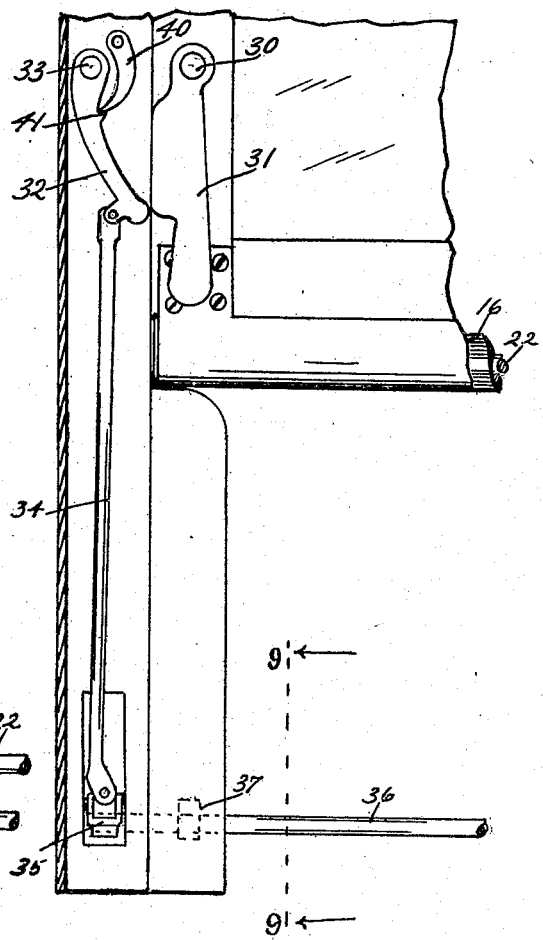
Fig-8-
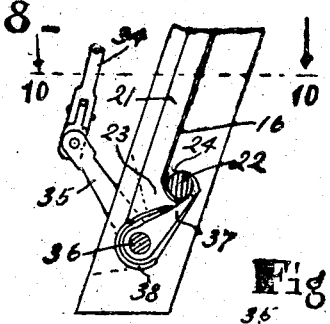
Fig-9-
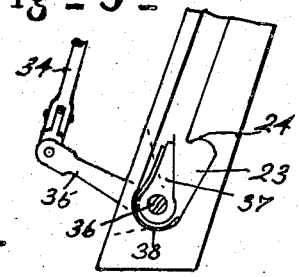
Fig-10-
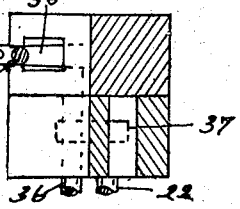
WITNESSES:
O. M. McLaughlin
O. M. Greener
INVENTOR.
Frederick E. Heylmann.
BY
V. H. Lockwood
ATTORNEY.

UNITED STATES PATENT OFFICE.

FREDERICK E. HEYLMANN, OF NOBLESVILLE, INDIANA.

VEHICLE-TOP DOOR.

936,892. Specification of Letters Patent. Patented Oct. 12, 1909.

Application filed November 27, 1908. Serial No. 464,639.

*To all whom it may concern:*

Be it known that I, FREDERICK E. HEYLMANN, of Noblesville, county of Hamilton, and State of Indiana, have invented a certain new and useful Vehicle-Top Door; and I do hereby declare that the following is a full, clear, and exact description thereof, reference being had to the accompanying drawings, in which like numerals refer to like parts.

The object of this invention is to provide an improved construction for doors in vehicle tops, the chief advantage being to cause the door when swung open to avoid collision with the wheels of the vehicle. The other advantages lie in the lightness and cheapness of the construction and the fact that when the door is open and swung back it will lie flatly against the vehicle top.

The chief feature of the invention consists in closing the upper part of the door opening by means of a rigid door suitably hinged and in closing the lower part of the door opening with a vertically movable spring roller curtain. This curtain is preferably mounted on the lower end of the rigid door, but whether it be so mounted or not, when the door is opened it will swing high and clear of the wheels. In the form herein shown the curtain is mounted on the rigid upper portion of the door and when the curtain is rolled up, the door as a whole is quite high above the wheels. When thus mounted, the curtain portion of the door is guided by grooves in the side walls of the lower part of the door opening and there are shoulders or catches at the lower ends of the guideways for engaging the rod at the lower end of the curtain to hold the curtain closed.

Another feature of the invention consists in arranging means whereby when the door latch is operated for opening the door, it will cause the simultaneous opening of the door curtain, which is an advantage when the door curtain is mounted on the lower part of the rigid portion of the door.

While the main purpose sought to be reached is the clearing of the wheels by the door, it is obvious that this makes a very light and cheap door and also one that is easy to manipulate and the curtain portion can be raised or lowered without opening the lower part of the door at all, and this is desirable in very cold weather.

The full nature of this invention will be understood from the accompanying drawings and the following description and claims.

In the drawings Figure 1 is a perspective view of a vehicle equipped with said improvement, with a door swung open. Fig. 2 is a front elevation of the vehicle, showing the door open so as to clear the wheels. Fig. 3 is a side elevation of the door and the portion of the top surrounding the door. Fig. 4 is a vertical section on the line 4—4 of Fig. 3, with the door closed. Fig. 5 is a horizontal section looking downwardly from the line 5—5 of Fig. 4. Fig. 6 is an inside view of a portion of the door and adjacent casing showing means for simultaneously releasing the curtain portion and the rigid portion of the door, the parts being shown in their closed position and partly broken away. Fig. 7 shows the same in actuated condition, the curtain being rolled up and the latch being actuated for releasing the rigid portion of the door. Fig. 8 is a section on the line 8—8 of Fig. 6. Fig. 9 is a section on the line 9—9 of Fig. 7. Fig. 10 is a section on the line 10—10 of Fig. 8.

The drawings in detail may be described as follows:

A suitable vehicle top 10 is mounted upon a body 11 carried upon wheels 12. So far as the invention herein is concerned the parts 10 and 11 may as a whole be treated as the vehicle top. This top has side openings quite usual in what are known as storm tops. It is observed that the upper part of the vehicle top is wider than the lower part and that the upper part is vertical while the lower part slants inwardly at an angle to the other part and that the doors must accommodate themselves to this irregular form of the sides of the vehicle top.

The door herein shown consists of two parts, a rigid upper part or frame 15 and a spring roller curtain 16 that forms the lower part of the door and closes the lower part of the opening. The upper part 15 is hinged as usual and the roller 17 of the curtain is mounted in connection with the lower part of the rigid portion of the door, as shown in Fig. 4. Metal guide plates 18 and 19 are secured to the lower part of the rigid portion of the door and project downwardly therefrom on each side of the curtain roller 17, so that when the door is closed those parts will overlap the enlargement 20 at the upper end of the vertical guide slots 21 in the side walls of the lower part of the door opening. The curtain has a rod 22 secured along its lower edge and said rod projects beyond the edges of the curtain so as to form guide projections that move through the guide slots 21. There is also an enlargement 23 at the lower end of these guide slots so formed as to furnish shoulders 24 to engage the ends of the rod 22 and hold the curtain closed. This rod may be disengaged by pulling the finger strap 25 that projects from the lower end of the curtain on the inside of the vehicle, or the curtain can be dislodged from the outside by merely pushing inwardly against the lower part of it, and when the rod 22 is dislodged the spring roller 17 will wind up the curtain into the position shown in Figs. 1 and 2 and thus diminish the vertical length of the door a foot or more, or in other words, elevate the lower part of the door so that when the door is swung open it will entirely clear the wheels and will fit flatly against the sides of the vehicle top when the door is thrown back. The curtain must always be released before the door is swung open because it is mounted on the door and when closed the curtain is held by the stationary vehicle top. This can be done by hand and means is herein provided for releasing the curtain by merely turning the door latch 30 when one wants to open the door, whether from the inside or the outside.

As shown in Figs. 6 and 7, the door also has a hand lever 31 on the inside which is in a horizontal position while the door is closed and extends downwardly when the door is opened, on the portion of the vehicle top adjoining the door there is mounted an arm 32 pivoted at 33 and at its free end pivoted to the connecting rod 34 that runs down to the arm 35 secured to a releasing rod 36 mounted in the vehicle top just below the door opening and at the lower ends of the guide slots 21. This rod 36 has at each end arms 37 that project behind the curtain rod 22 when the curtain is closed, see Fig. 8, and the parts are held in that position by springs 38. Therefore, these springs hold the rod 34 in its uppermost position, as seen in Fig. 6, and the arm 32 in engagement with the lever 31 on the door latch. As the door lever 31 is moved downwardly, as shown in Fig. 7, it actuates all these parts against the counter-action of the springs 38 and that dislodges the curtain rod 22, so that the curtain is rolled up by the time the door is ready to be opened. If desired, the pawl 40 may be used to catch the shoulder 41 on the arm 32 and hold said lever 32 out of the door opening and out of the way of a person getting in or out of the vehicle. But said pawl 40 must be released by the fingers before the curtain is closed.

What I claim as my invention and desire to secure by Letters Patent is:

1. A vehicle including wheels, a vehicle top carried thereby and having a side opening, a door for closing said opening consisting of an upper rigid frame portion suitably hinged to the vehicle top at the side of the door opening, and a vertically movable spring roller curtain mounted at the lower end of said rigid frame portion and which when drawn down forms the lower part of the door, and means for holding the curtain portion of the door in a lowered position, whereby when said curtain portion of the door is rolled up and the door is swung open it will not come in contact with the wheels of the vehicle.

2. A vehicle top with the upper portion of the side thereof substantially straight and the lower portion of the side thereof arranged at an angle to the upper portion and a door opening in the side of said top, a door consisting of an upper rigid portion hinged to the straight upper portion of the top, and a vertically movable spring roller curtain mounted on the lower end of the rigid portion of the door so that it can be drawn downwardly for closing the opening in the angular side portion of the top, and means for holding the curtain in closed position.

3. A vehicle top provided with a door opening, a hinged rigid door for closing the upper part of said opening, a vertically movable spring roller curtain for closing the lower part of said opening, guide projections extending beyond the lateral edge of said curtain, a guide-way in the side walls of the lower part of the door opening, and means for engaging the end of the curtain for holding it in its open position.

4. A vehicle top provided with a door opening, a door having an upper rigid portion for closing the upper part of the opening, a spring roller curtain mounted on the lower end of the rigid portion of said door with a rod secured to the lower end of said curtain with its ends projecting beyond the edges of the curtain, guide slots in the side walls of the lower part of the door opening, and shoulders in the side walls of the door opening at the lower end of said guide slots for catching the rod on the lower end of the curtain and holding the curtain closed.

5. A vehicle top provided with a door opening, a door having an upper rigid portion for closing the upper part of the opening, a spring roller curtain mounted on the lower end of the rigid portion of said door with a rod secured to the lower end of said curtain with its ends projecting beyond the edge of the curtain, guide slots in the side walls of the lower part of the door opening with the ends of said guide slots enlarged to accommodate the curtain when rolled up and the lower ends of said guide slots formed so as to provide a shoulder for catching the rod on the lower end of the curtain and holding the curtain closed, and guide strips secured to the rigid portion of the door and projecting below the same and over the enlarged upper ends of said slots to prevent the escape of the curtain rod from the slots during its manipulation.

6. The combination of the top of a vehicle with a door opening in the side thereof, a rigid door for closing the upper part of the door opening, a vertically movable spring roller curtain for closing the lower part of the door opening, means for catching the end of the curtain and holding the curtain closed, a door latch, and means controlled by the door latch for releasing the curtain preparatory to opening the door.

7. A vehicle top provided with a door opening, a rigid door for closing the upper part of said opening, a vertically movable spring roller curtain for closing the lower part of said opening, means for engaging the end of the curtain for holding it in its open position, means at the lower end of the door opening for catching the lower end of the curtain and holding the curtain closed, a latch for fastening the door when closed, and means actuated by said latch as it is being opened for dislodging and releasing the lower end of the curtain.

8. A vehicle top provided with a door opening, a rigid door for closing the upper part of the opening, a vertically movable spring roller curtain for closing the lower part of said opening, guide projections extending beyond the lateral edge of said curtain, a guide-way in the side walls of the lower part of the door opening, and means for engaging the end of the curtain for holding it in its open position, a rod mounted transversely at the lower part of the door opening so as to be oscillatable that is provided with arms lying behind the rod on the lower end of the curtain when the curtain is closed, a door latch for securing the door in its closed position, and means mounted in connection with the vehicle top in position to be actuated by the door latch preparatory to opening the door which returns said curtain releasing rod, whereby the curtain will be opened before the rigid portion of the door can be swung open.

In witness whereof, I have hereunto affixed my signature in the presence of the witnesses herein named.

FREDERICK E. HEYLMANN.

Witnesses:
V. H. LOCKWOOD,
O. M. GREENER.